(12) United States Patent
Glover

(10) Patent No.: US 9,405,748 B2
(45) Date of Patent: *Aug. 2, 2016

(54) PROBABILISTICALLY FINDING THE CONNECTED COMPONENTS OF AN UNDIRECTED GRAPH

(71) Applicant: International Business Machines Corporation, Armonk, NY (US)

(72) Inventor: Raymond S. Glover, Cambridge (GB)

(73) Assignee: International Business Machines Corporation, Armonk, NY (US)

(*) Notice: Subject to any disclaimer, the term of this patent is extended or adjusted under 35 U.S.C. 154(b) by 11 days.

This patent is subject to a terminal disclaimer.

(21) Appl. No.: 14/518,045

(22) Filed: Oct. 20, 2014

(65) Prior Publication Data

US 2015/0324404 A1 Nov. 12, 2015

Related U.S. Application Data

(63) Continuation of application No. 14/271,502, filed on May 7, 2014.

(51) Int. Cl.
*G06F 17/30* (2006.01)

(52) U.S. Cl.
CPC .......... *G06F 17/30* (2013.01); *G06F 17/30336* (2013.01); *G06F 17/30342* (2013.01); *G06F 17/30958* (2013.01)

(58) Field of Classification Search
USPC .......... 707/790, 797–798; 704/9; 706/12, 52; 370/254
See application file for complete search history.

(56) References Cited

U.S. PATENT DOCUMENTS

| | | | |
|---|---|---|---|
| 7,451,168 B1* | 11/2008 | Patterson | ............ G06F 12/0269 |
| 7,974,978 B2 | 7/2011 | Yan et al. | |
| 2009/0327377 A1 | 12/2009 | Ylonen | |
| 2010/0027442 A1 | 2/2010 | Chockler et al. | |
| 2010/0079458 A1 | 4/2010 | Koehler et al. | |
| 2010/0083194 A1 | 4/2010 | Bagherjeiran et al. | |
| 2010/0121792 A1* | 5/2010 | Yang | ................. G06F 17/30958 706/12 |

(Continued)

OTHER PUBLICATIONS

Huang, et al., "A Multi-Partitioning Approach to Building Fast and Accurate Counting Bloom Filters", 2013 IEEE 27th International Symposium on Parallel & Distributed Processing, pp. 1159-1170, © 2013 IEEE, <http://ieeexplore.ieee.org/xpl/articleDetails.jsp?tp=&arnumber=6569893&searchWithin%3DData+Structure%26sortType%3Ddesc_p_Publication_Year%26queryText%3DBloom+Filter>.

(Continued)

*Primary Examiner* — Hung T Vy
(74) *Attorney, Agent, or Firm* — Alexa L. Ashworth

(57) ABSTRACT

A method for probabilistically finding the connected components of an undirected graph. The method includes identifying a first edge, having a first and second vertex, and inserting information detailing the first and second vertex of the first edge into a bloom filter associated with a root node of a bloom filter data structure. A first node, connected to the root node, is created, comprising an associated bloom filter containing information associated with the first and second vertex of the first edge. The method includes identifying a second edge, having a first and second vertex, and inserting information detailing the first and second vertex of the second edge into a bloom filter associated with the root node of the bloom filter data structure. A second node, connected to the root node, is created, comprising an associated bloom filter containing information associated with the first and second vertex of the second edge.

5 Claims, 7 Drawing Sheets

(56) References Cited

U.S. PATENT DOCUMENTS

2013/0013567 A1     1/2013    Constantinescu et al.
2015/0324410 A1*   11/2015   Glover .............. G06F 17/30342
                                                                      707/610

OTHER PUBLICATIONS

Kaya, et al., "Algorithms for Offline Tracking of Connected Components in Large Evolving Networks", Department of Biomedical Informatics, The Ohio State University, provided by searcher, Oct. 11, 2013, <http://bmi.osu.edu/hpc/papers/Kaya12-DNASDM.pdf>.

"Wang, et al., An Undirected Graph Traversal based Grouping Prediction Method for Data De-duplication", 2013 14th ACIS International Conference on Software Engineering, Artificial Intelligence, Networking and parallel/Distributed Computing, pp. 3-8, © 2013 IEEE, <http://ieeexplore.ieee.org/xpl/articleDetails.jsp?tp=&arnumber=6598437&searchWithin%3DData+Structure%26queryText%3DUndirected+Graph>.

"Algorithms—Lecture 10: Disjoint Sets", provided by inventor in post disclosure, Aug. 30, 2013, pp. 1-12, © Copyright Jeff Erickson, <http://www.cs.uiuc.edu/~jeffe/teaching/algorithms/notes/10-unionfind.pdf>.

"Incremental Connected Components", Boost C + + Libraries, Boost Graph Library—1.53.0, provided by inventor in disclosure Main Idea on May 22, 2013, pp. 1-5, © Copyright 2000-2001 Jeremy Siek, Indiana University, Lie-Quan Lee, Indiana University, Andrew Lumsdaine, Indiana University, <www.boost.org/doc/libs/1_53_0/libs/graph/doc/incremental_components.html>.

"Bloom filter", Wikipedia, the free encyclopedia, provided by inventor in disclosure Main Idea on May 22, 2013, this page last modified on Dec. 12, 2013 at 12:39, printed [Dec. 13, 2013], <en.wikipedia.org/wiki/Bloom_filter>.

"Probabilistically Finding the Connected Components of an Undirected Graph", USPTO U.S. Appl. No. 14/271,502, filed May 7, 2014.

IBM Appendix P, list of IBM patents or patent applications treated as related, Oct. 20, 2014.

U.S. Appl. No. 14/518,045, filed Oct. 20, 2014.

U.S. Appl. No. 14/271,502, filed May 7, 2014.

Holm et al.; "Poly-Logarithmic Deterministic Fully-Dynamic Algorithms for Connectivity, Minimum Spanning Tree, 2-Edge, and Biconnectivity"; Journal of the ACM (JACM); vol. 48 Issue 4; Jul. 2001; pp. 723-760; ACM.

* cited by examiner

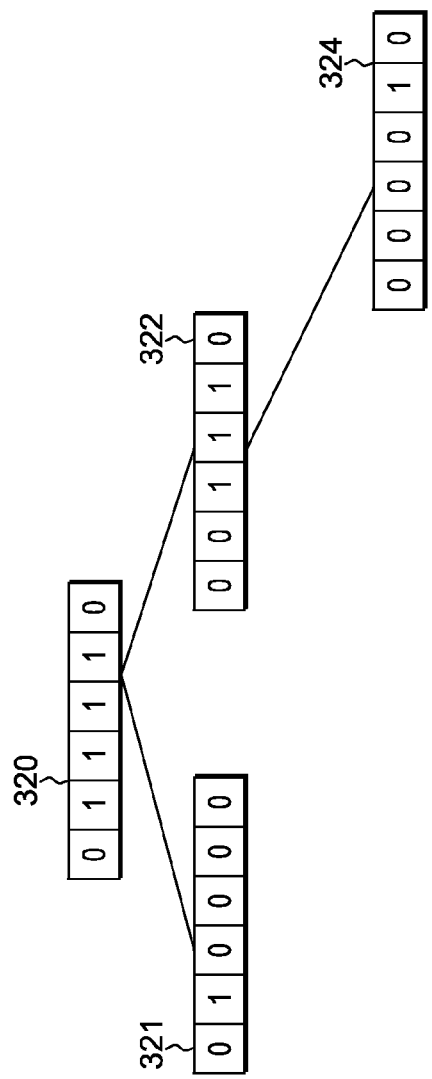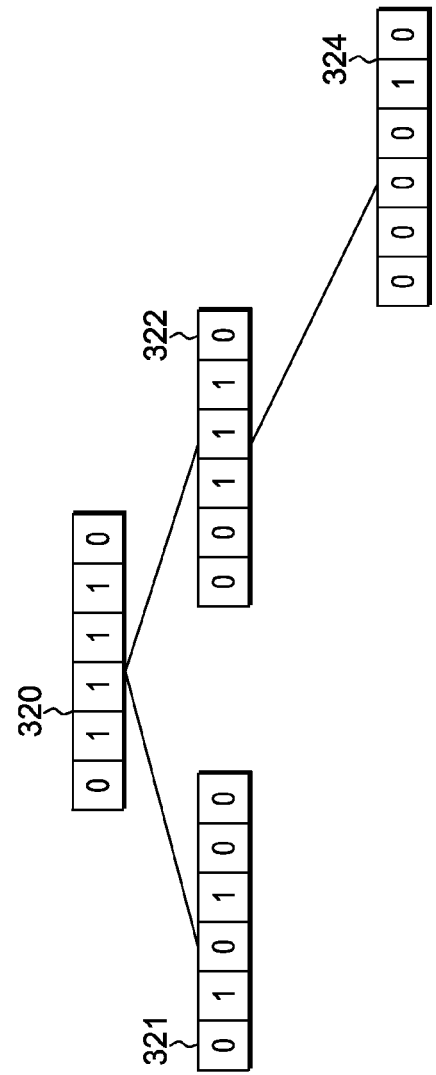

PROBABILISTICALLY FINDING THE CONNECTED COMPONENTS OF AN UNDIRECTED GRAPH

BACKGROUND OF THE INVENTION

The present invention relates generally to the field of data structures, and more particularly to probabilistically finding the connected components of an undirected graph.

A graph is a representation of a set of objects where some objects are connected by links, which can be used to model real-life networks, such as social media interactions. In a graph environment, a vertex represents a node, and an edge is a link between two vertices that may be directed or undirected (i.e., oriented in a certain direction or no orientation, respectively). A connected component of an undirected graph is a maximal set of connected nodes, in which any two nodes are connected to each other by a set of interactions, and are not connected to any additional nodes in the graph. Computing the connected components of a graph is a well-known task in graph theory and may be applied to real world tasks, for example, finding all the connected groups in a social network.

Multiple algorithms have been created to determine such events as when and how components are formed over time. Some algorithms may be implemented with systems in which the interactions are persistent, and there are no insertions and deletions of an edge or a node. Such algorithms usually require at least |E| space, where |E| is the number of edges, making the algorithm more suitable for smaller graph structures. Other algorithms, such as the union find algorithm, are suited for implementation in a growing graph environment in which edges are being added, and the graph must be continually updated.

A bloom filter is a probabilistic data structure that is designed to determine whether an element is likely present in a set, or not present in the set. Elements may be added to a set, but may not be removed unless an additional structure is implemented with the bloom filter, such as a counting bloom filter, which is a variant of a bloom filter that allows for deletions of elements from the bloom filter. A bloom filter is a space and time efficient structure for determining membership in a set; however, because of its probabilistic nature, there is a possibility that a false positive match may be returned.

SUMMARY

According to one embodiment of the present invention, a method, computer program product, and computer system for probabilistically finding the connected components of an undirected graph is provided. The computing device identifies a first edge having a first vertex and a second vertex and inserts information detailing the first vertex and the second vertex of the first edge into a bloom filter associated with a root node of a bloom filter data structure. The computing device creates a first node comprising an associated bloom filter containing information associated with the first vertex and the second vertex of the first edge, connected to the root node. The computing device also identifies a second edge having a first vertex and a second vertex, and inserts information detailing the first vertex and the second vertex of the second edge into the bloom filter associated with the root node of the bloom filter data structure. The computing device creates a second node comprising an associated bloom filter containing information associated with the first vertex and the second vertex of the second edge, connected to the root node.

BRIEF DESCRIPTION OF THE DRAWINGS

FIG. 3C-3E illustrate an example of a bloom filter data structure depicting the union process, using bit-wise logic, when both vertices of an edge are contained within different leaf nodes of the bloom filter data structure, in accordance with an embodiment of the present invention.

DETAILED DESCRIPTION

A binary tree may be a useful data structure to assist in modeling large, real life networks evolving over time. Similarly, bloom filters are useful probabilistic data structures that can save time and space when representing sets, such as the connected components of graphs. Embodiments of the present invention seek to determine a set of connected components in real time using bloom filters to represent the set of vertices contained within a connected component, so that each bloom filter representing a connected component may be queried (discussed in detail below) to determine whether a vertex is a member of that connected component, and whether two or more vertices are members of the same connected component.

Figure 1:
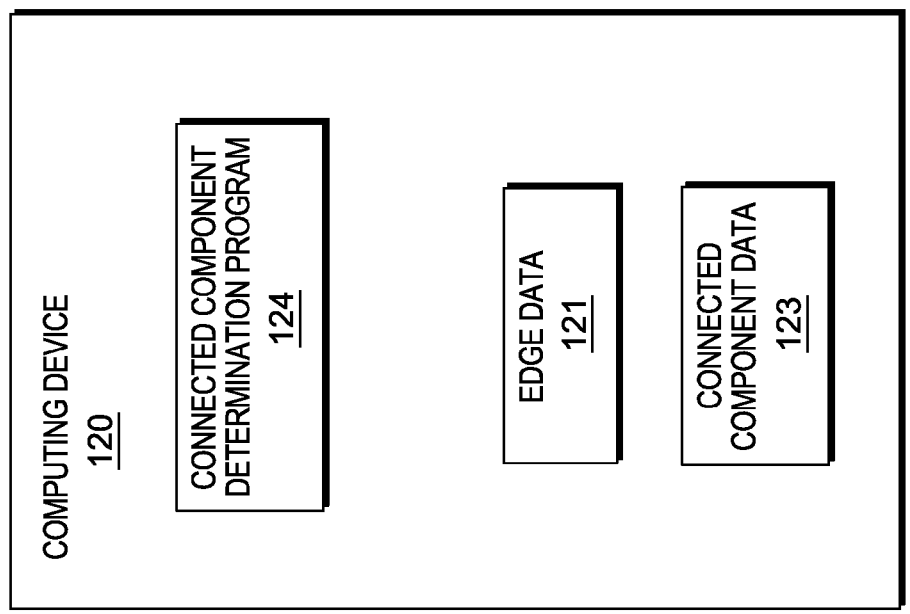
FIG. 1 is a functional block diagram illustrating a computing device, in accordance with an embodiment of the present invention.

The present invention will now be described in detail with reference to the Figures. FIG. 1 is a functional block diagram illustrating a computing device, designated 120, in accordance with one embodiment of the present invention. FIG. 1 provides only an illustration of one implementation, and does not imply any limitations with regard to the environments in which different embodiments may be implemented. Many modifications to the depicted environment may be made by those skilled in the art without departing from the scope of the invention as recited by the claims.

Computing device 120 includes edge data 121, connected component data 123, and connected component determination program 124. In various embodiments of the present invention, one or more of edge data 121, connected component data 123, and connected component determination program 124 are included within one program. Computing device 120 may include internal and external components, as depicted and described in further detail with respect to FIG. 4.

Edge data 121 includes the input information for each of the two vertices associated with a particular edge. A vertex is a fundamental unit that forms a graph, and an edge is a link that connects two vertices in a graph. Edge data 121 includes information reflective of the set of determined edge(s) to be input into a bloom filter data structure, to determine the connected components of an undirected graph, such as the set of edges input into the bloom filter data structure by connected component determination program 124 (discussed below). A bloom filter data structure is composed from a binary tree structure, which is a data structure where each node of the binary tree has either two or zero child nodes, and each node of the bloom filter data structure is a single bloom filter.

Connected component data 123 includes edge information for each connected component of an undirected graph, which includes an identification of the vertices associated with a particular edge within each connected component. Connected component data 123 includes the output information reflective of determined connected components, such as those determined by connected component determination program 124 (discussed below).

Connected component determination program 124 is software that is capable of probabilistically determining the connected components of an undirected graph, in accordance with an embodiment of the present invention. Connected component determination program 124 is capable of receiving information (e.g., edge data 121) detailing one or more edges of an undirected graph. In one embodiment, edge data 121 is input by a user, via a user interface. In another embodiment, connected component determination program 124 receives edge data 121 through another computing device, via a network such as the Internet.

Connected component determination program 124 is also capable of creating a bloom filter data structure. Connected component determination program 124 allows for the insertion of edge information into a bloom filter. Connected component determination program 124 allows for the deletion of edge information from a bloom filter, for example, through the use of a counting bloom filter (described below). In the exemplary embodiment, connected component determination program 124 is capable of determining connected components of an undirected graph by inserting edge information into a bloom filter data structure, searching the data structure, and utilizing the edge information to determine connected components. In other embodiments, connected component determination program 124, edge data 121, and connected component data 123 are stored on different devices and interact with each other via a network. The operations of connected component determination program 124 are discussed in further detail below with regard to FIGS. 2 and 3A-E.

Figure 2:
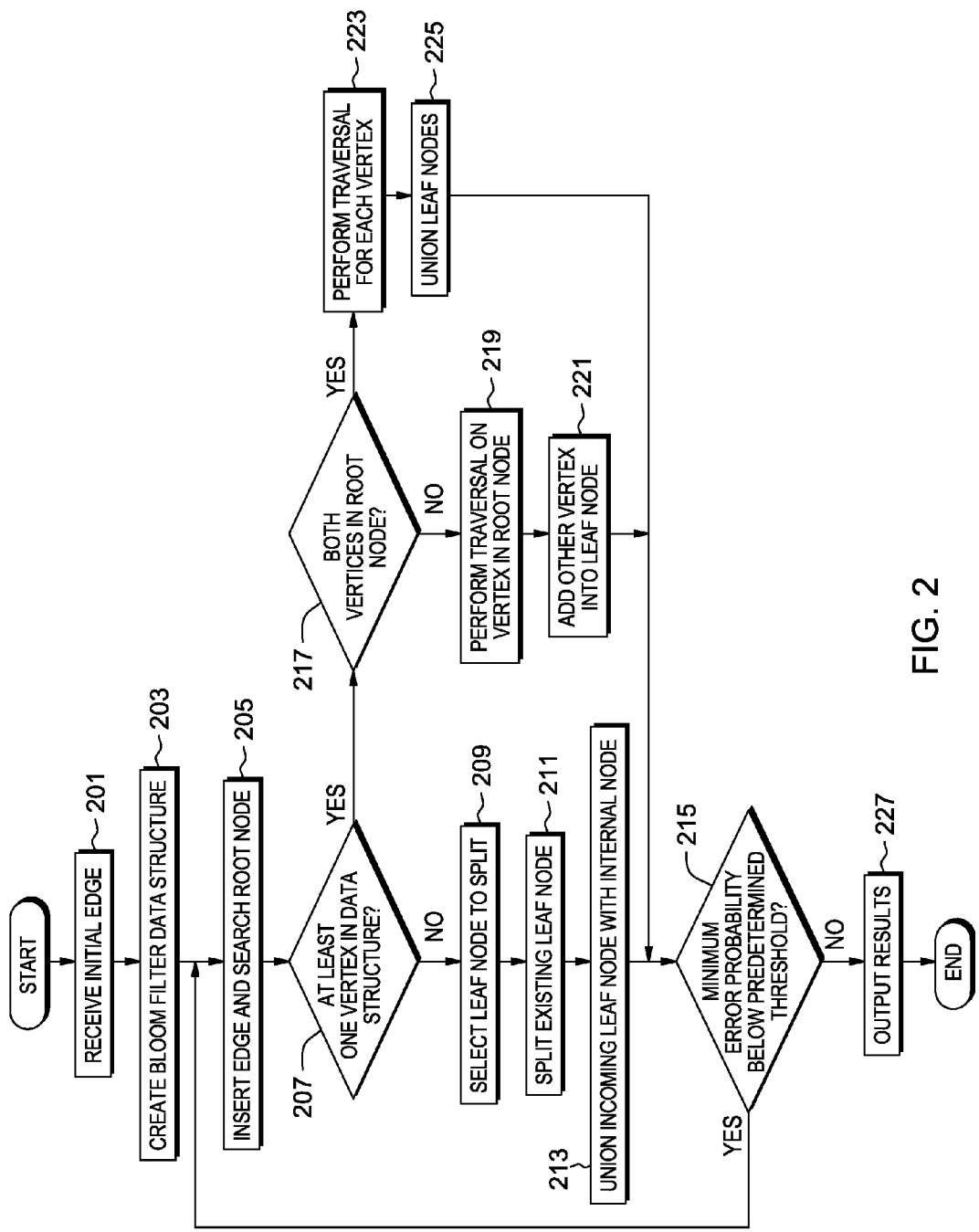
FIG. 2 is a flowchart depicting operational steps of a connected component determination program for probabilistically determining the connected components of an undirected graph, in accordance with an embodiment of the present invention.

FIG. 2 is a flowchart depicting operational steps of connected component determination program 124 for probabilistically determining the connected components of an undirected graph, in accordance with an embodiment of the present invention.

Connected component determination program 124 receives an initial edge (step 201). An edge is a link that connects two vertices in a graph, for example, v1 and v2. In the exemplary embodiment, only one edge needs to be known at the start of the algorithm, and a user selects one edge as the initial edge, or starting point, of the algorithm. In another embodiment, the set of all edges to insert into the bloom filter data structure does not need to be known at the start of the algorithm; rather, an initial sequence of edges is computed, and a user selects one edge from the sequence as the starting point of the algorithm. For example, a user may use a real-time stream of edge data, where the edge data is not immediately available but is being constantly updated in real time, such as on a social media website, so that new edges are continually received by connected component determination program 124 via a network.

Figure 3A:
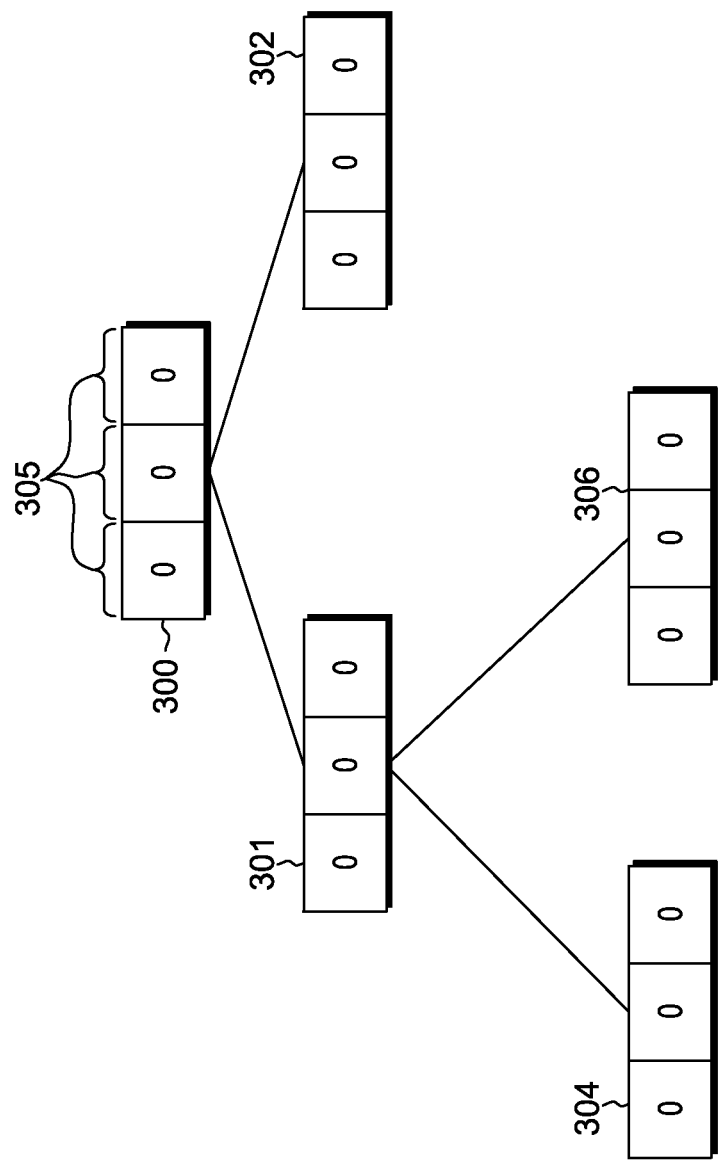
FIG. 3A illustrates an example of an empty bloom filter data structure, in accordance with an embodiment of the present invention.

Connected component determination program 124 creates a bloom filter data structure (step 203). In the exemplary embodiment, connected component determination program 124 creates a bloom filter data structure to probabilistically find the connected components of an undirected graph by using a binary tree, where each node of the tree is a single bloom filter and, after the set of edges of a graph are inserted into the bloom filter data structure, each leaf node (end node of the bloom filter data structure with no other nodes attached to it) contains the vertex information for one connected component. A bloom filter includes a bit array of m bits; a bit being a basic unit of information used in computing, initially all set to zero. A bloom filter also defines k different hash functions; a hash function being a set of algorithms that maps some set element to one or more of the m bit array positions using a uniform random distribution. An example of a bloom filter is depicted in FIG. 3A.

In the exemplary embodiment, prior to creating the bloom filter data structure, each bloom filter is first optimized in order to reduce the probability that the bloom filter data structure will return a false positive. For example, a user may decide at the start of the algorithm to use 0.00001 as the minimum error probability. An estimate of the number of edges that will be inserted into the bloom filter data structure may be used. For example, if each edge represents one financial bank transaction, and there are 1000 transactions per hour, and an estimate of the number of financial bank transactions within a 24 hour time period is desired, there would be an estimate of 24,000 financial bank transactions (edges). The minimum error probability decided by a user (p), and an estimate of the number of edges that will be inserted into the bloom filter data structure (n), are input into a standard formula, such as $$m = -\frac{n \ln p}{(\ln 2)^2},$$

to calculate the optimal minimum size of the bloom filter (m), where n is the number of inserted elements and p is the probability of a false positive. The optimal value of the number of hash functions (k), where $$k = \frac{m}{n} \ln 2,$$

may also be calculated. In the exemplary embodiment, the values of m and k are equal, and the values of m and k are kept the same for each bloom filter in the bloom filter data structure.

Connected component determination program 124 inserts an edge and performs a search of the root node of the bloom filter data structure (step 205). In the exemplary embodiment, when connected component determination program 124 inserts the initial edge into the bloom filter of the root node, no search is performed as there is no other vertex information yet in the bloom filter of the root node to search. In the exemplary embodiment, when a subsequent edge is inserted into the bloom filter of the root node of the bloom filter data structure, connected component determination program 124 searches, or queries, the bloom filter of the root node to test whether an edge is in the bloom filter data structure. Connected component determination program 124 queries for an edge by feeding the bloom filter of the root node each of the k hash functions to get the set of k array positions for both vertices of the edge, in order to determine whether zero, one, or both vertices of the edge are already contained within the bloom filter data structure.

Connected component determination program 124 determines if at least one vertex of the edge is in the bloom filter data structure (decision block 207). A vertex is not in the bloom filter data structure if, after inserting the k hash functions for each vertex of an edge into the bloom filter of the root node, any of the m bits at the k array positions are set to 0. A vertex is in the bloom filter data structure if, after inserting the k hash functions for a vertex into the bloom filter at the root node, all of the m bits at the k array positions are set to 1; however, there is also a possibility that a false positive (discussed below) occurred.

If neither vertex is contained within the bloom filter data structure (decision block 207, No branch), then connected component determination program 124 creates a bloom filter at a new leaf node in the bloom filter data structure to contain the vertex information, by first selecting an existing leaf node to split (step 209). In the exemplary embodiment, connected component determination program 124 selects an existing leaf node to split that will result in the bloom filter data structure remaining balanced on each side. In other embodiments, connected component determination program 124 selects any existing leaf node in the bloom filter data structure to split.

Connected component determination program 124 splits the selected existing leaf node (step 211). In the exemplary embodiment, connected component determination program 124 splits the selected existing leaf node by replicating the bloom filter of the selected existing leaf node so that the selected existing leaf node becomes an internal node, and the replication becomes a new leaf node.

Connected component determination program 124 unions the incoming leaf node (the node associated with the edge being inserted) with the internal node (step 213). In the exemplary embodiment, connected component determination program 124 performs a union between the internal node that was created from the selected existing leaf node in step 211 and the incoming leaf node, which contains the information for vertices of the edge that was inserted in step 205. The union process includes updating each node to which the incoming node is connected, up to the root node, with the vertex information contained in the incoming leaf node. The vertex information contained in the incoming leaf node is added to each connected node up the data structure by feeding the vertex information to each of the determined k hash functions, resulting in an output of k array positions, where each bit (m) at the resulting k array positions is set to 1.

Connected component determination program 124 determines if the minimum error probability is below the predetermined threshold (decision block 215). The bloom filters of the bloom filter data structure probabilistically represent the vertices of each connected component, creating substantial improvements in the memory consumption and calculation performance at the low cost of the accuracy of the algorithm. In the exemplary embodiment, there are an infinite number of edges (n) that can be inserted into the bloom filter data structure and, as the bloom filters are filled, connected component determination program 124 reaches a point where the minimum error probability goes beyond the predetermined threshold. For example, using the equation, $$m = -\frac{n \ln p}{(\ln 2)^2},$$

the number of inserted edges (n) increases as the algorithm runs until the minimum error probability (p) is no longer at a value desired by a user. For example, most bloom filters are initialized by a user to ensure that there is less than approximately a 0.01% chance of an error (false positive), and an error probability rate greater than 0.01% causes the space-savings of the bloom filter to become rapidly less favorable.

If the minimum error probability goes above the predetermined threshold, (decision block 215, No branch), connected component determination program 124 outputs the results (step 227) and ends. The output includes a set of bloom filters (the leaf nodes of the bloom filter data structure) that each represent a unique connected component, and each bloom filter may be queried to determine if a particular vertex is a member of the connected component.

If the minimum error probability remains below the predetermined threshold (decision block 215, Yes branch), connected component determination program 124 continues to step 205, inserts a next edge, and searches the root node.

If at least one vertex is contained within the bloom filter data structure (decision block 207, Yes branch), then connected component determination program 124 determines whether both vertices, for example v1 and v2, are contained within the root node (decision block 217). This is determined in the same manner as in step 205, by querying the bloom filter of the root node for the two vertices of the edge.

If connected component determination program 124 determines both vertices are not contained within the root node (decision block 217, No branch), then only one vertex is contained within the root node. Connected component determination program 124 performs a traversal (recursive search) of the bloom filter data structure for the vertex that is contained within the root node, for example, v1 to determine in which leaf node of the bloom filter data structure the vertex is contained (step 219). In the exemplary embodiment, connected component determination program 124 performs a recursive search of the bloom filter data structure, beginning at the root node, and following the path that returns a positive result from querying each node (bloom filter) with the information for v1, until a leaf node is reached.

If connected component determination program 124 determines that two paths return a positive result, one path must be incorrect (false positive), and connected component determination program 124 performs the recursive search down both paths until one path reaches a leaf node. The probability of both paths reaching a leaf node is statistically unlikely, so continuing the recursive search down both paths may lead to the correct path, while the other path may stop at an internal node which does not contain the information detailing the vertex (false positive path).

If the path reaches two leaf nodes, then an unrecoverable false positive has occurred. In one embodiment, when a false positive occurs, connected component determination program 124 will terminate automatically, when the false positive rate is above the determined minimum threshold probability. In another embodiment, when a false positive occurs, connected component determination program 124 reinitializes the bloom filter data structure with, for example, a larger bloom filter (greater m value), in an effort to avoid the false positive on a second run.

Connected component determination program 124 adds the other vertex of the edge, the vertex not contained within the root node, for example v2, into the leaf node containing the vertex that is contained within the root node, v1 (step 221). In the exemplary embodiment, connected component determination program 124 adds the other vertex information, v2, to the bloom filter of the leaf node, and adds the v2 information to each bloom filter of a parent node, up the bloom filter data structure to the root node.

Connected component determination program 124 determines if the minimum error probability is below the predetermined threshold (decision block 215). If the minimum error probability goes above the predetermined threshold, (decision block 215, No branch), connected component determination program 124 outputs the results (step 227) and exits (as described above). If the minimum error probability remains below the predetermined threshold (decision block 215, Yes branch), connected component determination program 124 continues to step 205, inserts a next edge, and searches the root node.

If both vertices are contained within the root node (decision block 217, Yes branch), then connected component determination program 124 performs a traversal (recursive search) of the bloom filter data structure (described above) for each vertex, to determine which leaf node(s) the vertices are contained in (step 223). In one embodiment, if connected component determination program 124 determines that the two vertices are already in the same leaf node (connected component), then the program continues to step 215, as the two vertices are already in the correct leaf node. In the exemplary embodiment, connected component determination program 124 determines that each vertex is contained in two different leaf nodes.

Connected component determination program 124 unions the leaf nodes that each vertex is contained in (step 225). Connected component determination program 124 updates the bloom filters of the nodes between the first leaf node and the common parent node by removing the vertex information contained in the bloom filter of the first leaf node from each bloom filter of the nodes between the first leaf node and the common parent node, and adds the vertex information contained in the bloom filter of the first leaf node to each bloom filter of the nodes between the common parent node and the second leaf node. In one embodiment, each bloom filter (node) is accompanied by a counting bloom filter, used to support the removal of information from the bloom filters of each node in the bloom filter data structure. In the same embodiment, for each bit m in the bloom filter, there are n bits in the corresponding counting bloom filter, used to count the number of entries occupying that position in the bloom filter.

In the exemplary embodiment, an algorithm using bit-wise logic is implemented to remove the information from each bloom filter (node) up the bloom filter data structure to the common ancestor. Connected component determination program 124 first determines the path between the two leaf nodes to be unioned by starting at one leaf node, following the path up to a common ancestor and down the other side of the bloom filter data structure, to the second leaf node. Connected component determination program 124 next determines which leaf node will be the destination of the union. Connected component determination program 124 then updates the intermediate nodes between the starting leaf node and the common ancestor by removing the vertex information of the bloom filter of the starting leaf node, using bit-wise logic, from the bloom filters of the intermediate nodes, and removing the sibling node of the starting leaf node (in a binary tree, removing a leaf node from the tree will also remove its sibling node). Connected component determination program 124 then adds the vertex information, using bit-wise logic, from the bloom filter of the common parent node to each bloom filter of the nodes, going down the other side of the bloom filter data structure until connected component determination program 124 reaches the destination leaf node.

Connected component determination program 124 determines if the minimum error probability is below the predetermined threshold (decision block 215). If the minimum error probability goes above the predetermined threshold, (decision block 215, No branch), connected component determination program 124 outputs the results (step 227) and ends (as described above). If the minimum error probability remains below the predetermined threshold (decision block 215, Yes branch), connected component determination program 124 continues to step 205, inserts a next edge, and searches the root node.

As an example, a user may want to find out if 2 people are in the same social network, where a social interaction between 2 people is indicative of being in the same social network. The social networks of all people, based on day-to-day exchanges of information (i.e., messages) and how the networks changes over time may be modeled using a graph environment. In this example, each vertex of the graph represents a unique user and an edge between two vertices (users) represents a message sent between 2 users. There may be, for example, greater than 100 million messages (edges) to analyze in some networks. In the example, connected component determination program 124 receives an input from a user of all the edge data (messages) between all people in a social network (step 201). Connected component determination program 124 then models the input edge data into sets of connected components (steps 203-225). By first finding the connected components of the graph environment, a user may efficiently reduce the amount of information (may be significantly greater than 100 million messages) from which to search and quickly remove parts of a dataset which have no influence on the subsequent social network analysis. In the example, once the connected components are determined, the data is output as a set of bloom filters, each bloom filter representing the set of interactions data (messages) for one connected component (social network) (step 227). The output data may be queried, to determine if a particular user, for example, user A, is a member of a particular social network (connected component) and also whether 2 users, for example, user A and user B, interact over the same social network (i.e., are in the same connected component). In an embodiment, an alert may be sent from connected component determination program 124 to indicate that a particular user is a member of a particular social network. For example, an alert may be sent when a criminal interacts with other users, to indicate potential criminal activity between the criminal and other users.

FIG. 3A illustrates an example of an empty bloom filter data structure. A binary tree, with each node represented as a single bloom filter, is depicted in which bloom filter 300 contains three (m) bits, bits 305, each initially empty (set to zero). Bloom filter 300 is a root node, the topmost node of the tree where the algorithm begins, bloom filter 301 is an internal node, and bloom filters 302, 304, and 306 are leaf nodes, or nodes that have no additional nodes below them in the tree.

Figure 3B:
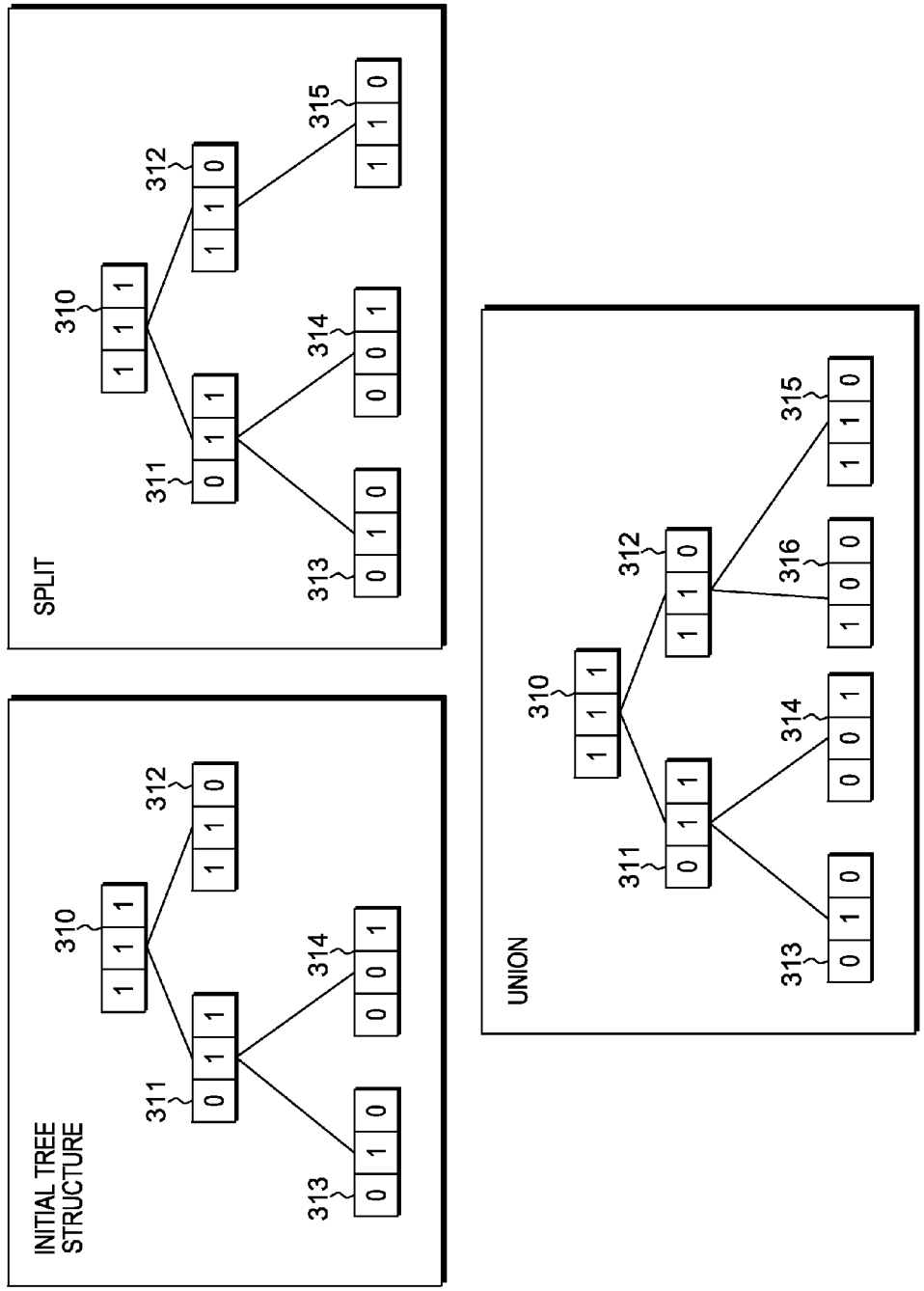
FIG. 3B illustrates an example of a bloom filter data structure depicting an initial tree structure, the split, and the union process when neither vertex of an edge is contained within the root node, in accordance with an embodiment of the present invention.

FIG. 3B illustrates an example of a bloom filter data structure depicting an initial tree structure, the split, and the union process when neither vertex of an edge is contained within the root node. In the Initial Tree Structure figure, leaf node 312 would be the leaf node selected to split in order to keep the bloom filter data structure balanced, as leaf node 312 is at a more shallow depth in the tree than leaf nodes 313 and 314. In the Split figure, leaf node 312 is selected and copied to new leaf node 315, so that leaf node 315 contains the same connected component information as leaf node 312, and leaf node 312 becomes an internal node. In the Union figure, incoming leaf node 316 is unioned with internal node 312. The connected component information contained in the bloom filter of leaf node 316 is added to the bloom filter of each node up the tree to the root node, which are bloom filters 312 and 310, in the Union figure of FIG. 3B.

Figure 3C:
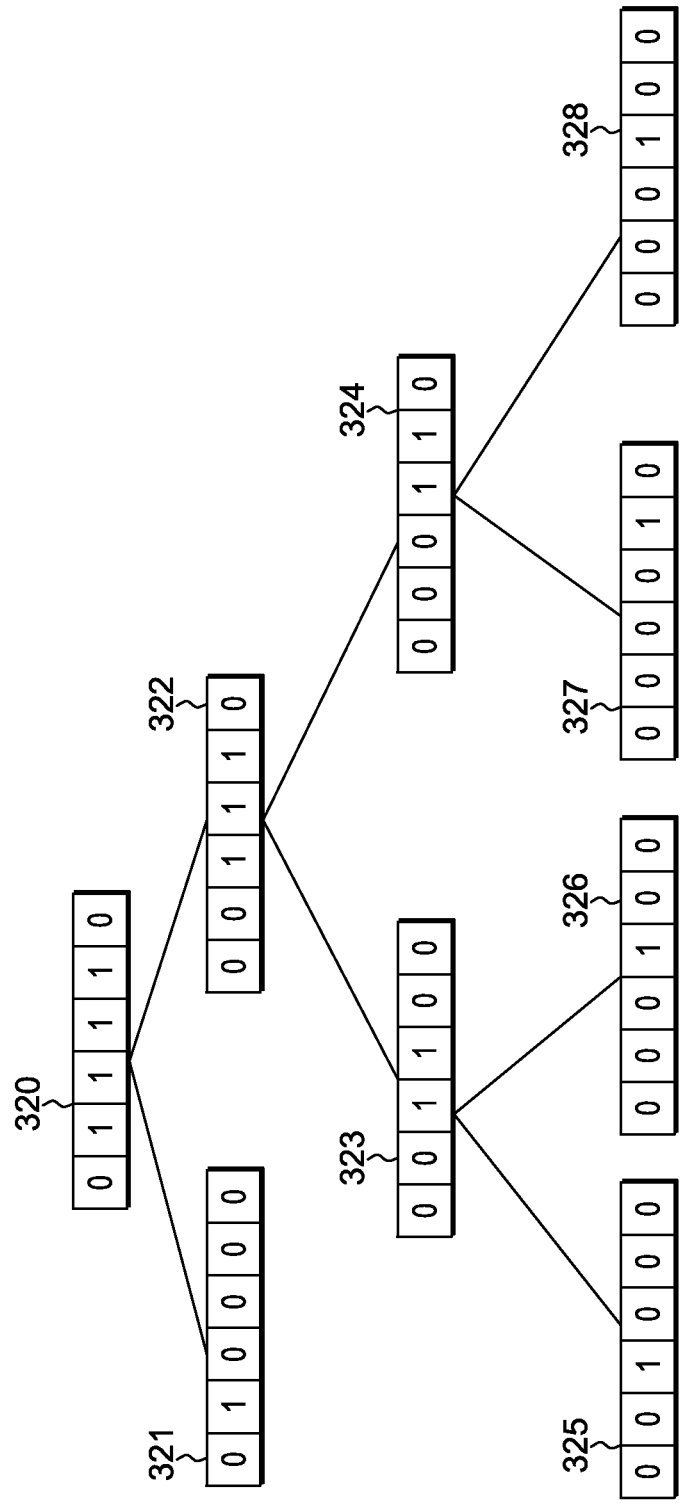

FIGS. 3C-E illustrate an example of a bloom filter data structure depicting the union process, using bit-wise logic, when both vertices of an edge are contained within different leaf nodes of the bloom filter data structure. In FIG. 3C, in the starting bloom filter data structure, connected component determination program 124 determines the two leaf nodes to be unioned are leaf node 321 and leaf node 328. Leaf node 321 is chosen as the destination of the union between leaf node 321 and leaf node 328, as leaf node 321 has a shorter depth than leaf node 328, and the tree will remain more balanced. Connected component determination program 124 determines the path in the bloom filter data structure between the two leaf nodes to be unioned by starting at leaf node 328 and following the path up to node 324, then node 322, then the root node 320 (common ancestor of leaf nodes 321 and 328), and down the other side of the tree to leaf node 321 (the nodes of the path are depicted in FIGS. 3D-E).

The vertex information contained in the bloom filter of leaf node 328 is removed from the bloom filters of nodes 324 and 322 using bit-wise logic, and leaf node 327 (sibling node) is removed from the tree. The resulting bloom filter nodes, as depicted in FIG. 3D (the unaffected nodes, nodes 323, 325, and 326 from FIG. 3C are not depicted), are the updated bloom filters of nodes 324 and 322, and the removal of leaf node 327 results in the bloom filter of node 324 containing the same vertex information as the bloom filter of leaf node 327.

FIG. 3E depicts the updated nodes of the bloom filter data structure after a union of two leaf nodes (the unaffected nodes, nodes 323, 325, and 326 from FIG. 3C are not depicted). As depicted in FIG. 3E, the information from the bloom filter of the starting node (FIG. 3C, leaf node 328) is added to each bloom filter of the nodes in the path down the tree, using bit-wise logic, until the destination node (FIG. 3E, leaf node 321) is reached, starting at, but not including, the common ancestor (FIG. 3E, root node 320). The result of the union is all of the vertex information from the bloom filter of leaf node 328 has been added to the bloom filter of leaf node 321, as all of these vertices are in the same connected component.

Figure 4:
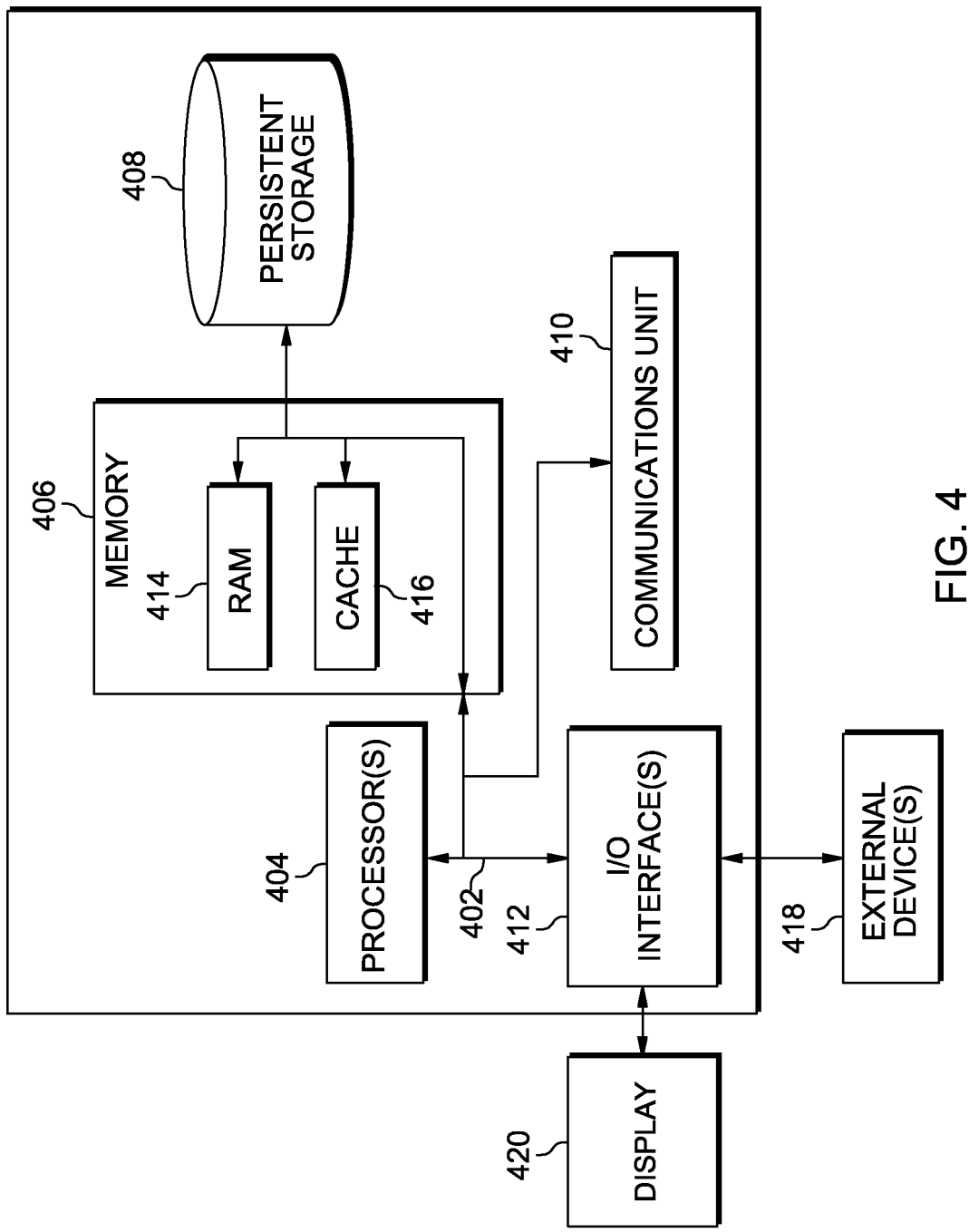
FIG. 4 depicts a block diagram of internal and external components of a data processing system, such as the client computing device of FIG. 1, in accordance with an embodiment of the present invention.

FIG. 4 depicts a block diagram of components of computing device 120, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 120 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

Edge data 121, connected component data 123, and connected component determination program 124 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Edge data 121, connected component data 123, and connected component determination program 124 may be downloaded to persistent storage 408 through communications unit 410.

I/O interface(s) 412 allows for input and output of data with other devices that may be connected to client computing device 120. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., edge data 121, connected component data 123, and connected component determination program 124 can be stored on such portable computer readable storage media and can be loaded onto persistent storage 408 via I/O interface(s) 412. I/O interface(s) 412 also connect to a display 420. Display 420 provides a mechanism to display data to a user and may be, for example, a computer monitor or an incorporated display screen, such as is used in tablet computers and smart phones.

The programs described herein are identified based upon the application for which they are implemented in a specific embodiment of the invention. However, it should be appreciated that any particular program nomenclature herein is used merely for convenience and, thus, the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for probabilistically finding the connected components of an undirected graph, the method comprising:
    identifying, by one or more computer processors, a first edge of the undirected graph, the first edge having a first vertex and a second vertex;
    inserting, by one or more computer processors, information detailing the first vertex and the second vertex of the first edge into a bloom filter associated with a root node of a bloom filter data structure;
    creating, by one or more computer processors, a first node, wherein the first node has a first associated bloom filter containing information associated with the first vertex and the second vertex of the first edge, connected to the root node;

identifying, by one or more computer processors, a second edge of the undirected graph, the second edge having a first vertex and a second vertex;

inserting, by one or more computer processors, information detailing the first vertex and the second vertex of the second edge into the bloom filter associated with the root node of the bloom filter data structure;

creating, by one or more computer processors, a second node, wherein the second node has a second associated bloom filter containing information associated with the first vertex and the second vertex of the second edge, connected to the root node; and searching, by one or more computer processors, the first node having the first associated bloom filter and the second node having the second associated bloom filter, for information associated with a third vertex, wherein the third vertex is a member of a connected component of the undirected graph.

2. The method of claim 1, wherein a node of the bloom filter data structure is associated with a bloom filter.

3. The method of claim 1, further comprising:

identifying, by one or more computer processors, a third edge having a first vertex and a second vertex;

inserting, by one or more computer processors, a first set of information associated with the first vertex of the third edge and a second set of information associated with the second vertex of the third edge into the bloom filter associated with the root node;

determining, by one or more computer processors, the first vertex of the third edge is contained in the bloom filter associated with the root node;

determining, by one or more computer processors, the first vertex of the third edge that is contained in the bloom filter is associated with the first node or the second node; and adding, by one or more computer processors, information associated with the second vertex of the third edge, to the bloom filter associated with the first node or the second node, containing information associated with the first vertex of the third edge.

4. The method of claim 1, further comprising:

identifying, by one or more computer processors, a third edge having a first vertex and a second vertex;

inserting, by one or more computer processors, a first set of information associated with the first vertex of the third edge and a second set of information associated with the second vertex of the third edge into the bloom filter associated with the root node;

determining, by one or more computer processors, a first vertex and a second vertex of the third edge are contained in the bloom filter associated with the root node;

determining, by one or more computer processors, the first vertex of the third edge is associated with the bloom filter associated with the first node, and the second vertex of the third edge is associated with the bloom filter associated with the second node; and adding, by one or more computer processors, the first node containing information associated with the first vertex of the third edge to the second node containing information associated with the second vertex of the third edge.

5. The method of claim 1, further comprising:

identifying, by one or more computer processors, a third edge having a first vertex and a second vertex;

inserting, by one or more computer processors, a first set of information associated with the first vertex of the third edge and a second set of information associated with the second vertex of the third edge, into the bloom filter associated with the root node;

determining, by one or more computer processors, the first vertex of the third edge and the second vertex of the third edge are not contained in the bloom filter associated with the root node;

replicating, by one or more computer processors, the first node, wherein a third node identical to the first node is created;

creating, by one or more computer processors, a fourth node, wherein the fourth node has an associated bloom filter containing the information associated with the first vertex of the third edge and the information associated with the second vertex of the third edge; and adding, by one or more computer processors, the information associated with the first vertex of the third edge and the information associated with the second vertex of the third edge, into the first node.

* * * * *